United States Patent Office 2,906,698
Patented Sept. 29, 1959

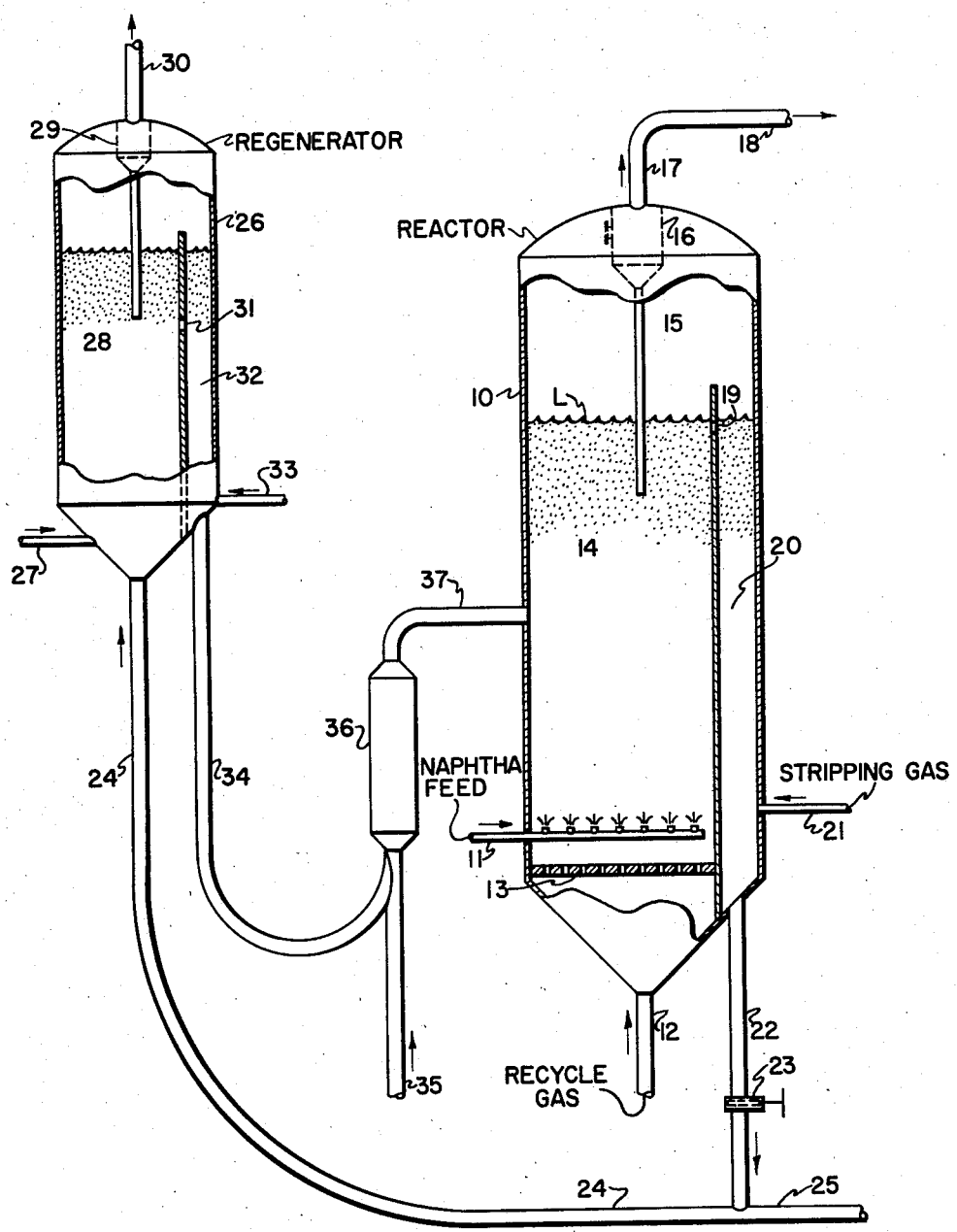

2,906,698

HYDROFORMING PROCESS WHEREIN THE REGENERATED MOLYBDENUM OXIDE CATALYST IS CONTACTED WITH A SULFUR COMPOUND

Edward Wheelock Steele Nicholson, Marnell Albin Segura, and Leo Broussard, Baton Rouge, La., assignors to Esso Research and Engineering Company, a corporation of Delaware Application December 30, 1954, Serial No. 478,710

3 Claims. (Cl. 208—136)

This invention pertains to the catalytic conversion of hydrocarbons and more particularly to the catalytic reforming or hydroforming by the fluidized solids technique of hydrocarbon fractions boiling within the motor gasoline or naphtha range of low octane number into high octane number motor fuels rich in aromatics.

It is known that petroleum naphthas can be subjected to a reforming treatment to yield liquid products boiling within the naphtha or motor gasoline boiling range and possessing improved octane numbers and better engine cleanliness characteristics. A well known and widely used method for upgrading petroleum naphthas is called hydroforming. In hydroforming, the naphtha feed stock is treated at elevated pressures of from 15 to 1000 lbs. per sq. inch and at temperatures of from 750–1050° F. in the presence of solid catalyst particles and hydrogen or recycle gas rich in hydrogen. A variety of reactions including dehydrogenation, paraffin and naphthene isomerization, cyclization or aromatization, hydrogenation and hydrocracking occur during hydroforming. All these reactions contribute to the production of a product of increased value not only because of its higher octane number but also because of its improved cleanliness characteristics due to the elimination of gum-forming unsaturated constituents and the removal of sulfur.

Catalysts that have been used for hydroforming include metals such as platinum and palladium as well as oxides and sulfides of metals such as molybdenum, chromium, vanadium and tungsten. These catalyst components are usually supported or distributed upon a base or spacing agent, preferably upon an adsorptive or high surface area, alumina-containing composition such as various adsorptive or activated aluminas, alumina gel, zinc aluminate spinel and the like.

In view of the ever increasing demands for more and higher octane number "premium" motor fuels, a great deal of research effort has been directed toward the development of new catalysts having increased or high activity, thereby permitting the charging of greater quantities of feed stock to a reactor of a given size and/or having greater selectivity thereby yielding greater quantities of final product of high octane number. Much effort has also been directed toward the development of new techniques in the actual conduct of the hydroforming reaction in order to improve or maintain catalyst activity and selectivity in order to increase the yields of the desired high octane number motor fuel products and minimize process losses in the form of dry gas formation and the deposition of inactivating carbonaceous products upon the catalyst.

Molybdic oxide on alumina catalysts appear to be among the most desirable for use in the hydroforming of naphthas by the fluidized solids technique. It has been found, however, that with extended use, catalysts of this type become more sensitive to conditions under which the catalyst is reduced with hydrogen, subsequent to regeneration and prior to the hydroforming portion of the process cycle. With extended use, the molybdenum oxide, which is generally completely converted to $MoO_3$ during oxidative regeneration, becomes more readily reduced to a lower oxide. Moreover, during the reduction and/or during the hydroforming reaction the reduced form ($MoO_2$) develops a tendency to form large crystallites, greater than 50 Angstrom units in size and which are readily detectable by the X-ray diffraction technique. The formation of such large crystallites leads to a substantial loss in catalyst activity and also catalyst selectivity. In order to maintain a commercially operable process, the formation of such large crystallites of $MoO_2$ must be eliminated or kept to a minimum.

It has been proposed to eliminate or minimize the formation of crystalline $MoO_2$ by control of the partial pressure of water existing during the reduction of the oxidized or regenerated catalyst. It was proposed in this connection to maintain the water partial pressure existing during the reduction step at below 0.4 atmosphere and preferably as low as 0.1 atmosphere with a maximum temperature of 1100° F. It is not possible to remove water completely from the fluidized solids reactor system since water is formed during the reduction step. Since some catalysts show a tendency to form crystalline $MoO_2$ in spite of the fact that low water partial pressures are maintained during the reduction it appears highly desirable to develop other techniques for minimizing the production of crystalline $MoO_2$.

It is the object of this invention to provide the art with a method for minimizing the formation of crystalline molybdenum dioxide in a fluidized solids hydroforming reaction system.

It is also the object of this invention to provide a method of treating molybdic oxide-containing catalysts so that the formation of large molybdenum oxide crystallites during hydroforming operations in accordance with the fluidized solids technique is prevented or minimized.

These and other objects will appear more clearly from the detailed specification and claims which follow.

It has now been found that the formation of crystalline molybdena or $MoO_2$ crystallites of large size (i.e., in the range of about 50 Angstrom units or above) can be effectively prevented by contacting the freshly regenerated catalyst particles with very small amounts of a sulfur compound such as hydrogen sulfide, carbon disulfide, sulfur dioxide, sulfur vapor, mercaptans or the like, preferably in admixture with hydrogen or a hydrogen-rich gas of low water content. Although the amount of sulfur compound used is small, sufficient to react with at most about 1 to 10 weight percent of the molybdenum, this is sufficient to retard or prevent the formation of large crystallites of $MoO_2$ even when conditions conducive to the formation of large crystallites (high water partial pressure and high temperatures) are applied.

Reference is made to the accompanying drawing which illustrates diagrammatically a flow plan of one embodiment of the present invention.

Referring to the drawing, 10 is the reactor vessel or hydroformer to which preheated naphtha feed is supplied through inlet line 11 and recycle gas is supplied through inlet line 12 below a distributor grid or the like 13. The reactor is charged with a suitable molybdic oxide-containing catalyst, for example, one consisting essentially of about 10 wt. percent molybdic oxide upon an adsorptive or activated alumina. The vapor velocity through the reactor is controlled to form a dense fluidized bed 14 of catalyst suspended in reactant vapors and gases having a definite level L or interface separating it from a disperse or dilute phase 15 in the upper part of the reactor vessel. The reaction products are withdrawn overhead from the reactor through a cyclone separator 16 or the like which separates the bulk of the entrained catalyst for return to the reactor dense bed. The reaction products are withdrawn from the reactor through line 17 and are passed via line 18 to suitable product recovery and storage facilities not shown.

Catalyst is continuously discharged from bed 14 through a restriction orifice 19 into a withdrawal well or stripping section 20. A stripping gas such as steam is supplied to the lower part of section 20 through inlet line 21 and passes upwardly through said section to strip adsorbed or entrained hydrocarbons from the descending catalyst particles. Suitable baffles may be included within section 20 to enhance this stripping action. The stripped catalyst particles descend from section 20 into standpipe 22 wherein sufficient fluistatic pressure is built up to effect the transfer of the spent catalyst to the regeneration zone. A slide valve 23 or the like is arranged near the base of the standpipe to control the discharge of catalyst into transfer line 24. A suitable transport gas such as flue gas, steam or air is supplied through line 25 to pick up the catalyst discharged from standpipe 22 and convey it through conduit or riser line 24 into regenerator 26. If air is used, it is preferred that less than the total amount of air necessary for regeneration be used as transport gas in order to limit the temperature rise in line 24.

Air or additional air is supplied to the lower part of regenerator 26 through inlet line 27 to burn all or substantially all of the carbonaceous deposits from the catalyst. Gas velocities through the regenerator 26 are controlled to maintain a dense fluidized bed 28 of catalyst particles suspended in regeneration gas. Regeneration gases pass overhead from regenerator 26 through a cyclone separator 29 for the recovery and return of entrained catalyst to the regenerator dense bed. The regeneration gases, substantially free of catalyst pass through line 30 to a waste gas stack or to suitable scrubbing and storage facilities in the event that it is desired to use the gas for stripping or other purposes. The regenerated catalyst particles flow continuously from the dense bed 28 through a restriction orifice 31 into withdrawal well or stripping section 32. Stripping gas may be supplied through line 33 to the lower portion of stripping section 32 in order to strip oxygen and/or carbon oxides from the regenerated catalyst. Cooling coils (not shown) may be provided within the dense bed 28 of regenerator 26 to remove excess heat produced during regeneration of the catalyst.

The regenerated catalyst particles are discharged into U-bend transfer line 34. On the downstream (riser) side of this U-bend, a small pretreating vessel 36, which may be merely an enlarged section of the line, is provided. This vessel or enlargement is designed to provide a total time of contact for the circulating catalyst stream of only 0.1 to 1 second from the lower end of the vessel to the point of discharge of line 37 into reactor 10. At the inlet end of pretreater 36 is introduced through line 35 a stream of pretreating gas, such as hydrogen-rich recycle gas. A small amount of a sulfur compound is also introduced along with this pretreating gas through line 35. The pretreated catalyst is entrained overhead from pretreater 36 by the gas stream and carried through line 37 into reactor 10.

It will be appreciated that the embodiment shown is merely illustrative of one way in which the present process may be carried out and that numerous alternatives readily suggest themselves. For example, external rather than internal strippers may be used, aeration may be provided on the standpipes and solids transfer lines to maintain the solids in fluid form. Moreover, the present invention is applicable in systems in which an inert heat carrier is circulated to increase heat transfer between the regenerator and the reactor. Moreover the specific treatment with the sulfur compound or a mixture of sulfur compound and hydrogen-containing gas can be carried out in a number of ways. For example the pretreater 36 may be located below the reactor 10 and the entire recycle gas stream, with added sulfur compound, may be introduced through line 35 to carry the catalyst into the bottom of the reactor through line 12. The treatment of the regenerated catalyst in the upflow side of the U-bend and in the pretreater shown may be very limited so that the catalyst passing from the pretreater into the reactor will still undergo substantial reduction within the dense bed 14. Or, a separate pretreating vessel may be provided from which the pretreating gases containing water formed during pretreating are withdrawn overhead and pretreated catalyst is withdrawn from a dense bed within the pretreat vessel for return to the reactor. In a further embodiment sufficient equilibrium reactor catalyst may be supplied to the pretreater or to the regenerated catalyst entering the pretreater to reduce the temperature of the catalyst undergoing pretreatment to a temperature about 50 to 100° F. above reactor temperature. It is also possible, if desired, to pass the regenerated catalyst directly to the reactor vessel, i.e. without passing through a separate pretreater vessel as shown, but with the addition of a sulfur compound to the recycle gas entering the reactor.

The feed or charging stock to the hydroforming reactor may be a virgin naphtha, a thermally or catalytically cracked naphtha, a Fischer-Tropsch naphtha or the like having a boiling range of from about 125–450° F. or it may be a narrow boiling cut from within this range. The feed stock is ordinarily preheated alone or in admixture with recycle gas to reaction temperature or to the maximum temperature possible while avoiding thermal degradation of the feed stock. Ordinarily preheating is carried out at about 800–1050° F., preferably about 1000° F. Hydrogen or hydrogen-rich recycle process gas which contains 50 volume percent or more of hydrogen is preheated to about 1000–1200° F. and circulated through the reaction zone at a rate of from about 500 to 8000 cubic feet per barrel of naphtha feed.

The catalysts used in accordance with the present invention consist essentially of molybdenum oxide upon an adsorptive, high surface area support such as activated alumina, or alumina gel. The catalysts contain from about 5 to 15 wt. percent molybdenum oxide, preferably about 10 wt. percent. The catalyst bases may contain small amounts of from about 1.0 to 10 wt. percent silica in order to improve their stability to heat. The catalyst particles should, for proper fluidization, be between about 200 and 400 mesh or about 10 to 200 microns in diameter with a major proportion between about 20 and 100 microns.

The hydroforming reactor vessel is operated at about 850–1050° F., preferably about 900–950° F. and at pressures of about 50 to 1000 pounds per sq. inch, preferably about 200 lbs. per sq. inch. A small water partial pressure of about 0.1 to about 3.0 mol percent can desirably be maintained in the reaction zone.

The regenerator is operated at essentially the same pressure as the hydroforming reactor vessel and at temperatures of about 1000 to 1200° F., or low enough to avoid any danger of thermally degrading the catalyst. Average residence time of catalyst in the reactor is of the order of about 1 to 4 hours and in the regenerator of from about 3 to 15 minutes.

The sulfur compounds used in accordance with the present invention to minimize the formation of crystalline $MoO_2$ are hydrogen sulfide, sulfur dioxide, sulfur vapor, mercaptans and carbon disulfide, alone or preferably mixed with hydrogen or a hydrogen-rich gas such as recycle process gas. The amount of sulfur compound should be small, ordinarily such an amount as will react with at most about 1 to 10 weight percent of the molybdenum present in the catalyst. The preferred treating agent is hydrogen sulfide and is applied in admixture with hydrogen or hydrogen-rich recycle gas during the pretreating of the catalyst. It is preferred that the hydrogen sulfide-hydrogen mixture be very low in water content, below about 0.4 mol percent water and that the sulfur-hydrogen-containing gas be used in sufficient amount to avoid the build-up of a substantial water partial pressure through reduction of the $MoO_3$ in the regenerated catalyst.

Crystalline $MoO_2$ formation during pretreating is greater the higher the partial pressure of water in the gas. Since most of this water is produced during the reduction of the catalyst, it is desirable to use the highest ratio of pretreat gas to catalyst that is feasible. However, for those operations wherein the catalyst is pretreated in a separate vessel and the pretreated catalyst is introduced directly into the side of the reactor, only a part of the recycle gas can be used for pretreating because the bulk of the recycle gas must be introduced at the bottom of the reactor for fluidization of the main reactor catalyst bed. The use of an outside pretreater makes possible arrangements wherein the pretreat gas with its associated water produced during pretreating can be bypassed around the main reactor bed thus avoiding the deleterious effect of this water on the hydroforming reactor. When the pretreat gas is not separated from the pretreated catalyst, it may be preferable to introduce the total stream of pretreated catalyst and gas into the bottom of the reactor through line 12 rather than through line 37 as indicated in the drawing. This makes possible the use of all the recycle gas for pretreating and thus reduces the water partial pressure during the pretreating operation.

Since crystalline $MoO_2$ formation is greater with higher water partial pressure, which in turn is dependent on the ratio of pretreat gas to catalyst used, the amount of sulfur compound added during pretreating must be greater when smaller ratios of pretreat gas to catalyst are employed in order to minimize crystalline molybdena formation under all conditions. Crystalline $MoO_2$ formation under given pretreating conditions increases with increasing temperature of pretreat. Hence it is desirable to pretreat at as low a temperature as practicable, and for this reason, recycle of catalyst from the reactor to the pretreat zone is practiced, or pretreating is carried out within the reactor vessel itself in some cases. However, the bad effects of high pretreating temperature on crystalline $MoO_2$ formation can be off-set to a large extent by holding the time of contact of catalyst with pretreating gas at the high temperature to a very short time. This time should be less than 1 sec., and preferably in the range of 0.2–0.7 sec. at 1100° F. Here again, the more severe the pretreating conditions for crystalline molybdena formation, the more sulfur compound per mol of molybdenum is required. Under severe conditions, involving high water partial pressure or high temperatures for relatively long times of pretreat, the sulfur required to keep crystalline molybdena at a satisfactorily low level amounts to about 10 wt. percent based on molybdenum in the catalyst. For the milder pretreating conditions involving use of high ratios of pretreat gas to catalyst and/or low pretreat temperatures in the range of 900–1000° F., the sulfur required amounts to only about 1–5 wt. percent of the molybdenum.

When all the recycle gas is used to pretreat the catalyst, the ratio of recycle gas to catalyst may be in the range of 15–30 cu. ft./lb. of catalyst. These numbers apply for operations wherein the total recycle gas rate is 4000–5000 cu. ft./bbl. and the catalyst/oil ratio is in the range of 0.5–1. For operations in which inert heat transfer solids are circulated to carry heat from the regenerator to the reactor, the quantity of recycle gas used is reduced, and the ratio of recycle gas to catalyst is correspondingly lower. When the catalyst is pretreated in a separate vessel with only part of the recycle gas, the ratio of recycle gas to catalyst may be in the range of 1–5 cu. ft./lb. of catalyst.

As one example of an operation employing this invention, catalyst circulated at 1.0 catalyst/oil ratio is pretreated with 4000 cu. ft./bbl. of recycle gas containing 65% hydrogen in a pretreat section located directly below the reactor, and the total stream of pretreated catalyst and recycle gas is introduced below the bottom gas distributor of the reactor. The temperature of pretreating is 1125° F. and the total time of contact of catalyst with pretreating gas before the catalyst is introduced into the reactor is 0.3 sec. Hydrogen sulfide gas is introduced into the pretreating zone along with the recycle gas in the amount of 2.2 cu. ft. of $H_2S$/bbl. of oil feed. This amounts to a concentration of 0.055 mol. percent of the recycle gas, or about 1.3 wt. percent of the molybdenum on the catalyst being pretreated.

The advantageous effect of sulfur compounds in reducing crystalline $MoO_2$ formation has been amply demonstrated in laboratory experiments. These experiments have shown the importance of water partial pressure and the amount of sulfur used on suppression of crystalline $MoO_2$ formation. They have also shown that the older the catalyst is, the more sulfur is required to prevent crystalline $MoO_2$ formation at given conditions of pretreating. A laboratory test has been devised which duplicates very closely the crystalline $MoO_2$ formation a given catalyst undergoes in actual plant use. This laboratory test is carried out in a so-called standard reduction unit (SRU) at atmospheric pressure in a fluidized bed at 850° F., for 30 minutes. Runs have been made with mixtures of 67% steam and 33% hydrogen, and with 20% steam and 80% hydrogen to show the effect of water partial pressure. Results obtained with the 67% steam-33% hydrogen mixture correspond very closely with plant data on crystalline molybdena formation for operations with outside pretreating using part of the recycle gas. The laboratory operations with the 20% steam mixture (0.2 atm. of steam partial pressure) give results corresponding to pretreatment with about 4000 cu. ft./bbl. of recycle gas, such as would be encountered by pretreating with all the recycle gas in the reactor itself or in a pretreat vessel located just below the reactor. When fresh catalysts are tested for their crystalline $MoO_2$ susceptibility, they are first subjected to laboratory aging by heating 20 hours at 1400 F. in a muffle furnace. Plant used catalysts do not require laboratory aging. The following examples are illustrative of the present invention.

EXAMPLE 1

A commercial plant used catalyst containing 10 wt. percent $MoO_3$ upon alumina containing about 2 wt. percent $SiO_2$ when subjected to the standard reduction unit test (SRU) with 67% $H_2O$–33% $H_2$ showed 40% of crystalline $MoO_2$.

The same reduction procedure was applied with the exception that first 0.25% $H_2S$ and then 0.5% $H_2S$ (based upon hydrogen) was added to the reducing gas. The results obtained were as follows.

|  | Crystalline $MoO_2$, percent |
|---|---|
| SRU+0.25% $H_2S$ during reduction | 31 |
| SRU+0.50% $H_2S$ during reduction | 26 |

EXAMPLE 2

Another sample of the catalyst used in Example 1 was first treated with 0.5% $H_2S$ and dry hydrogen at 850° F. for 30 min. and then subjected to the standard reduction test. This sample tested 0% crystalline $MoO_2$ showing the substantial advantage of a pretreat with hydrogen sulfide and hydrogen in the complete absence of water vapor.

EXAMPLE 3

The same catalyst as was tested in Example 1 was used in a 50 barrel per day fluid hydroformer for a period of 25 days, and another sample was canister aged in a fixedbed hydroformer for 11 months. The canister aged sample and the catalyst discharged from the 50 B./D. unit at the end of the run were regenerated with air for 16 hours at 1000° F. and then subjected to standard atmospheric pressure reduction procedures with 67% $H_2O$ and with 20% $H_2O$, as well as reduction procedures in accordance with the present invention, i.e. with $H_2S$ added to the pretreating gas. The results obtained are summarized in the following table.

*Table I*

EFFECT OF SULFUR COMPOUNDS ON CRYSTALLINE $MoO_2$ FORMATION

| Catalyst | Reduction conditions | | Crystalline $MoO_2$, percent | Sulfur added by $H_2S$—Mols S per mol Mo |
|---|---|---|---|---|
| | Water partial pres. atm. | $H_2S$ in $H_2$, percent | | |
| Regen. used | 0.67 | 0 | 35 | 0 |
| Do | 0.67 | 0.1 | 27 | 0.018 |
| Do | 0.67 | 0.3 | 20 | 0.06 |
| Do | 0.67 | 1.0 | 0 | 0.18 |
| Do | 0.20 | 0 | 0 | 0 |
| Regen. canister aged | 0.67 | 0 | 56 | 0 |
| Do | 0.67 | 1 | 5 | 0.18 |
| Do | 0.20 | 0 | 22 | 0 |
| Do | 0.20 | 0.1 | 0 | 0.018 |
| Do | 0.20 | 0.25 | 0 | 0.04 |
| Do | 0.20 | 0.5 | 0 | 0.09 |

As may be seen from the table, 18 mol percent or 6 wt. percent sulfur based on molybdenum was sufficient to prevent crystalline $MoO_2$ formation in the used catalyst when treated under very wet conditions. Moreover, while the canister aged samples showed a much more pronounced tendency to form crystalline $MoO_2$, 6 wt. percent sulfur based on molybdenum sufficed to lower crystalline $MoO_2$ to 5% during very wet pretreatment, while as little as 0.6 wt. percent sulfur is sufficient to lower crystalline $MoO_2$ to 0% in the drier pretreatment (20% $H_2O$).

EXAMPLE 4

The canister aged sample of Example 3 and another plant used catalyst were treated with $H_2SO_4$ to increase the $SO_4$ content. They were then subjected to SRU to test for crystalline $MoO_2$ and then tested for hydroforming activity in a laboratory unit (HCTU test). The values given for this test are based upon a comparison with the results obtained with the fresh catalyst in the same test unit. The results are summarized in Table II col. 7.

The foregoing description contains a limited number of embodiments of the present invention. It will be understood that this invention is not limited thereto since numerous variations are possible without departing from the scope of this invention.

What is claimed is:

1. In a process for hydroforming hydrocarbon fractions in contact with catalysts consisting essentially of molybdenum oxide upon an adsorptive support in accordance with the fluidized solids technique the improvement which comprises continuously withdrawing catalyst from the hydroforming reaction zone, subjecting the withdrawn catalyst to oxidative regeneration to remove inactivating, carbonaceous deposits and convert the molybdenum oxide to $MoO_3$, withdrawing regenerated catalyst from the regeneration zone, subjecting the withdrawn oxidized catalyst to treatment with hydrogen and with a sulfur compound in an amount sufficient to react with at most 1 to 10 wt. percent of the molybdenum whereby the formation of crystallites of molybdenum dioxide, particularly those above 50 A. units in size, on said catalyst is substantially inhibited and recycling the thus treated catalyst to the hydroforming reaction zone.

2. In a process for hydroforming hydrocarbon fractions in a reaction zone at a reaction temperature in contact with a fluidized catalyst comprising 5 to 15 wt. percent of molybdenum oxide on an adsorptive support, the improvement which comprises withdrawing catalyst from said reaction zone, oxidatively regenerating the catalyst so withdrawn and oxidizing the molybdenum catalyst compounds to $MoO_3$, treating this oxidized catalyst in a treating zone for a time less than one second with a gas comprising less than 0.4 mol percent water, hydrogen, and a sulfur compound selected from the group consisting of hydrogen sulfide, sulfur dioxide, sulfur vapor, mercaptans, carbon disulfide and mixtures thereof, the amount of said sulfur compound being sufficient to react with 1 to 10 wt. percent of the molybdenum on said regenerated catalyst, and recycling the catalyst so treated to said hydroforming reaction zone, whereby the formation of crystallites of molybdenum dioxide, particularly those about 50 A. units in size, on said catalyst is substantially inhibited, and the catalyst activity is maintained.

3. The process of claim 2 wherein additional amounts of catalyst are withdrawn from said reaction zone and mixed with the catalyst in said treating zone to maintain a temperature therein 50° to 100° F. above said reaction temperature.

*Table II*

SULFATES ADDED TO CATALYST

| Cat. description | Percent $SO_4$ | HCTU test [1] | | Sulfur by $SO_4$ add. | | Crystalline $MoO_2$, percent |
|---|---|---|---|---|---|---|
| | | $\Delta C_5+$ | Rel. w./h./w. | Mols S per mol Mo | Weight percent S on cat. | |
| Regen. used cat.+ SRU | Ca. 0.2 | +1 | 1.0 | 0 | 0 | 35 |
| Regen. used cat.+ 1.0% $SO_4$ | 1.0 | +1 | 1.0 | 0.15 | 0.33 | 0 |
| Regen. canister Aged+SRU | Ca. 0.2 | +1 | 0.8 | 0 | 0 | 56 |
| Regen. canister aged+1.5% $SO_4$ | 1.5 | +1 | 0.9 | 0.23 | 0.50 | Trace |

[1] Data shown reflect results on test catalysts relative to those on fresh catalyst.

References Cited in the file of this patent

UNITED STATES PATENTS

| | | |
|---|---|---|
| 2,131,089 | Beeck et al. | Sept. 27, 1938 |
| 2,184,235 | Groll et al. | Dec. 19, 1939 |
| 2,269,028 | Liedholm | Jan. 6, 1942 |
| 2,288,336 | Welty et al. | Jan. 30, 1942 |
| 2,315,144 | Watson | Mar. 30, 1943 |
| 2,386,050 | Holder | Oct. 2, 1945 |
| 2,642,383 | Berger et al. | June 16, 1953 |
| 2,642,384 | Cox | June 16, 1953 |
| 2,772,217 | Nicholson | Nov. 27, 1956 |